United States Patent Office 3,480,660
Patented Nov. 25, 1969

3,480,660
CATALYST FOR FLUIDIZED BED OPERATION
Darrell W. Walker and Leo A. McReynolds, Bartlesville, Okla., assignors to Phillips Petroleum Company, a corporation of Delaware
No Drawing. Filed Feb. 7, 1966, Ser. No. 525,284
Int. Cl. C07c *121/04, 121/32;* B01j *11/46*
U.S. Cl. 260—465.3              8 Claims

ABSTRACT OF THE DISCLOSURE

Calcium oxide is incorporated in silica particles impregnated with alkali metal cyanide to render the resulting composite catalyst useful in fluidized bed operation in the synthesis of acrylonitrile from HCN and $C_2H_2$, whereas the silica-alkali metal cyanide particles, alone, do not remain fluidized in the reaction ambient for a suitable period.

---

This invention relates to a method of improving the fluidizing properties of a catalyst comprising essentially a silica support impergnated or otherwise intimately admixed with one or more alkali metal cyanides and to the use of the improved catalyst in a fluidized bed reactor in the catalytic conversion of fluid reactant. A specific aspect of the invention is concerned with the use of the improved catalyst in the production of acrylonitrile by reacting hydrogen cyanide and acetylene.

Acrylonitrile is a polymerizable material whose uses are well known. A convenient method for its preparation is by the reaction of hydrogen cyanide and acetylene. The reaction can be easily catalyzed by alkali metal cyanides which are associated with a material such as charcoal. A disadvantage to such a process is that the charcoal catalyst, while very effective, is not regenerable and must be frequently replaced with freshly prepared catalyst. Since this is a serious deficiency, efforts have been made to replace the charcoal component of such a catalyst with another material which could withstand conventional regeneration such as burning in an oxygen flame. Silica gel is such a durable material but silica catalysts impregnated with alkali metal cyanides, through useful in fixed bed operation, have been tried and found seriously wanting in fluidization capacity.

The invention is concerned with the improvement of the fluidization characteristics of a catalyst composite consisting principally of a porous silica support impregnated with one or more alkali metal cyanides.

Accordingly, it is an object of the invention to improve the fluidizing characteristics of finely comminuted porous silica impergnated or otherwise intimately admixed with one or more alkali metal cyanides. Another object is to provide a novel catalyst composition having good fluidizing characteristics when comminuted to a particle size in the range of about 50 to 325 mesh. A further object is to provide a porous silica-alkali metal cyanide composite catalyst for reacting hydrogen cyanide and acetylene to produce acrylonitrile in a fluidized bed process. It is also an object of the invention to provide a supported alkali metal cyanide catalyst useful in the catalytic reaction of hydrogen cyanide and acetylene to produce acrylonitrile, which catalyst is regenerable. Other objects of the invention will become apparent to one skilled in the art upon consideration of the accompanying disclosure.

It has been found that such a regenerable silica-supported catalyst which shows adequate activity for the preparation of acrylonitrile can be improved by the addition of minor quantities of calcium oxide. A significant advantage realized by the addition of calcium oxide is an improved fluidization characteristic of the catalyst. The catalyst of the present invention, therefore, can be utilized effectively in a fluid bed contacting technique which is particularly desirable with the conversion of hydrogen cyanide and acetylene to acrylonitrile.

Thus, a broad aspect of the invention comprises incorporating in a catalyst comprising a porous silica support impregnated with at least one alkali metal cyanide a small but effective concentration of calcium oxide, which improves the fluidization characteristics of the composite catalyst. The resulting catalyst, when comminuted to a particle size in the range of 50 to 400 mesh, is suitable for fluidized bed contacting of fluid reactant catalyzed by the composite, such as a reactant stream of hydrogen cyanide and acetylene which are converted to acrylonitrile.

This acrylonitrile synthesis reaction is very exothermic and care must be utilized to prevent the formation of hot spots within the reaction zone. Such hot spots hurt the selectivity of the reaction and produce excessive amounts of coke. A fluidized contact technique is more effective for minimizing such hot spots. Further, a fluidized contacting technique is more satisfactory when a process is carried out on a continuous basis. In such operation, catalysts can be continuously removed, regenerated, and continuously returned to the reaction zone to maintain a steady state of operation. In conrtast, undesirable process cycling results with many fixed bed operations, particularly when catalysts which have short lives or which behave differently on aging are used.

The silica which is suitable for use in the catalyst of the present invention can be any conventional catalytic grade silica such as precipitated silica gel, flame hydrolyzed silica, microspheroidal silica, aerogel silica, and the like. Silica which is preferred is a finely divided material which is produced by the precipitation of an aqueous sodium silicate solution in such a way that the resulting precipitated silica, after being attrition ground, contains sufficient residual alkali to produce a pH of about 8.5.

The catalyst of the present invention is prepared by associating the silica with about 5 to about 35 weight percent, based upon the total catalytic composition, of alkali metal cyanide. This is conveniently accomplished by impregnating the finely divided silica with an aqueous solution of a suitable alkali metal salt. Such impregnation generally causes some agglomeration of the powder after subsequent drying, and these agglomerates are then generally ground and screened to the particular size desired for the conversion technique contemplated. A fluidized technique generally requires particles less than about 50 mesh in size. The impregnated particles are then heated for periods of about 1–30 hours in a stream of flowing dry air or other oxygen containing gas while at a temperature of about 900–1500, preferably 900–1100° F. Exposure of the dried impregnated, and air-activated solid to a stream of hydrogen cyanide at elevated temperatures is adequate to convert the alkali metal salt to the cyanide form. Alkali metal halides, alkali metal nitrates or alkali metal cyanides themselves are suitable for this impregnation. A mixture of sodium and potassium salts is presently preferred.

The calcium oxide is introduced into the catalyst at any convenient point in its preparation. A suitable calcium-containing salt or compound can be associated with the catalyst by impregnation before, during, or after the impregnation of the alkali metal compound. Any suitable salt which will yield calcium oxide on calcination is suitable for use in the catalyst preparation. Some examples are calcium chloride, calcium nitrate, calcium acetate, calcium formate, and the like. Sufficient calcium compound is introduced to provide a quantity of calcium oxide in the finished catalyst in the range of about 0.1 to about 20 weight percent based upon the weight of the total catalyst.

In the acrylonitrile process, according to this invention, the hydrogen cyanide is contacted with the acetylene in the presence of the above-described catalyst using any conventional contacting technique. As mentioned earlier, the fluidized bed technique is particularly applicable. The contacting is carried out within the broad temperature range of about 650 to about 1000° F., at any convenient pressure, including atmospheric pressure.

High gaseous hourly space velocities promote the desired reaction to some degree, but at the expense of lower conversion of the feed materials. Generally, however, the gaseous hourly space velocity will be in the range of about 50 to about 3000 v./v./hour. The ratio of hydrogen cyanide and acetylene in the feed stream can vary over a wide range but will generally approximate the stoichiometric proportions. An excess of acetylene is sometimes beneficial. Other gases such as hydrogen or inert gases such as nitrogen can also be present in the feed stream.

The effluent from the reaction zone can be treated conventionally to isolate the acrylonitrile. For example, the acrylonitrile can be recovered by water-washing the effluent stream. Unconverted hydrogen cyanide and acetylene can be recycled if desired. Other nitrile by-products which are obtained in varying degrees from this process are acetonitrile and propionitrile.

The invention is illustrated by the following example.

EXAMPLE

Several silica-supported alkali metal cyanide catalysts were prepared containing various levels of cyanides and of the calcium oxide adjuvant. The general preparation was to impregnate a finely divided commercial silica (Quso G–30, a precipitated, attrition-ground silica having a pH of about 8.5, a particle size of about 12 millimicrons, and a surface area of about 325 m.$^2$/g.) with an aqueous solution of sodium cyanide, potassium cyanide, and calcium formate. The resulting slurry was dried on a hot plate and screened to a 200–325 mesh. Portions of the composite were charged into a tubular glass reactor to form 1–3 ml. catalytic bed. The bed was activated by heating to the activation temperature at a rate of about 100° F. per 10 minutes. The activation was continued in a stream of dry air for about 16 hr. The catalyst bed was then treated for 1 hr. with a stream of gas comprising 90 percent hydrogen and 10 percent hydrogen cyanide (by volume) while at the activating temperature.

The temperature of the reactor and catalyst bed was adjusted to 930–950° F. and the conversion of HCN and acetylene to acrylonitrile was carried out by passing a feed stream containing 80 mole percent hydrogen, 10 mole percent HCN and 10 mole percent acetylene thru the reactor at a gaseous hourly space velocity of 1000–1500 v./v./hr. Several 4 hr. runs with different catalysts were made. Fluidization was visually observed. The effluent gases were analyzed by gas-liquid chromatography.

The conditions of the tests and the results obtained are shown in the following table.

CONVERSION OF HCN AND $C_2H_2$ TO ACRYLONITRILE

| Run No. | Cyanides [1] wt. % | CaO, wt. percent | Fluidizability, hrs. | Cat. activity log K [2] | Selectivity [3] |
|---|---|---|---|---|---|
| Activation of catalyst at 930° F. | | | | | |
| 1 | 9.5 | 0.5 | 3.3 | 0.78 | 0.56 |
| 2 | 8.0 | 2.0 | 3.8 | 0.74 | 0.52 |
| 3 | 15.0 | 0.0 | 2.6 | 0.59 | 0.38 |
| 4 | 15.0 | 10.0 | 3.5 | 0.74 | 0.36 |
| 5 | 19.0 | 1.0 | 1.0 | 1.05 | 0.66 |
| 6 | 16.0 | 4.0 | 2.9 | 1.15 | 0.53 |
| 7 | 25.0 | 0.0 | 0.0 | 0.58 | 0.63 |
| 8 | 25.0 | 10.0 | 3.5 | 0.80 | 0.57 |
| Activation of catalyst at 1,100° F. | | | | | |
| 9 | 9.5 | 0.5 | 0.6 | 0.77 | 0.66 |
| 10 | 8.0 | 2.0 | 3.8 | 0.63 | 0.63 |

[1] Comprises equal weight quantities of NaCN and KCN.

[2] $K = \dfrac{\text{moles } C_2H_2 \text{ converted} \times 10^6}{\text{cc catalyst} \times \text{sec} \times \text{atm}}$

[3] Selectivity $= \dfrac{\text{moles acrylonitrile obtained}}{\text{moles acetylene consumed}}$ The data in the above table show that the presence of CaO in the catalyst improves the fluidizability of the catalyst over that of another catalyst which has no CaO or less CaO. The improvement is noted at several levels of CaO and at several levels of cyanide loading, though greater benefits appear to be obtained by adding CaO to catalysts having relatively large quantities of the alkali salts. The addition of CaO appears to have no great effect on the catalyst activity or selectivity.

Certain modifications of the invention will become apparent to those skilled in the art and the illustrative details disclosed are not to be construed as imposing unnecessary limitations on the invention.

We claim:

1. The method of improving the fluidizing characteristics of a finely particulate catalyst consisting essentially of a porous silica support intimately admixed with at least one alkali metal cyanide, which method comprises adding CaO by impregnation to said silica support wherein the amount of said alkali metal cyanide is in the range of from about 5 to about 35 weight percent and the amount of CaO is in the range from about 0.1 to about 20 weight percent of the total catalyst.

2. The method of claim 1 wherein the silica is impregnated with an aqueous solution of alkali metal compound selected from the group consisting of halide, nitrate, and cyanide; when using other than the cyanide, drying the impregnated silica in particulate form in a stream of air at a temperature in the range of 900 to 1500° F., followed by contacting the dried particles with hydrogen cyanide at an elevated temperature to form alkali metal cyanide; and when using the cyanide, drying and activating the catalyst composite by heating same in a stream of air at a temperature in the range of 900 to 1500° F.

3. The method of claim 1 wherein said silica in finely comminuted form is impregnated with an aqueous solution of sodium and potassium cyanides and a soluble calcium salt convertible to the oxide upon heating, the resulting composite is dried and comminuted to a mesh size in the range of 50 to 325, and the particulate composite is activated in a stream of $O_2$-containing gas at a temperature in the range of 900 to 1500° F.

4. A catalyst consisting essentially of a porous silica support impregnated with at least one alkali metal cyanide and with a calcium oxide in a concentration effective in rendering said catalyst readily fluidizable for a substantial period of time when in particulate form in a mesh size in the range of 50 to 325 wherein the amount of said alkali metal cyanide is in the range of from about 5 to about 35 weight percent and the amount of CaO is in the range from about 0.1 to about 20 weight percent of the total catalyst.

5. The catalyst of claim 4 wherein the alkali metal cyanide consists essentially of sodium and potassium cyanides.

6. A process for reacting HCN and $C_2H_2$ which comprises fluidizing the catalyst of claim 5 in an enclosed reaction zone with a fluidizing gas comprising hydrogen cyanide and acetylene in a temperature range of from about 650 to about 1000° F. so as to form acrylonitrile and recovering the acrylonitrile from said reaction zone.

7. A process which comprises: (a) adding CaO by impregnation to a porous silica support, said impregnation occurring before, during, or after said silica is intimately admixed with at least one alkali metal cyanide thus forming a finely particulate catalyst wherein the amount of said alkali metal cyanide is in the range of from about 5 to about 35 weight percent and the amount of CaO is in the range of from about 0.1 to about 20 weight percent of the total catalyst, (b) reducing the resulting catalyst formed by step (a) to a particle size in the range of 50 to 325 mesh, (c) fluidizing the resulting particulate catalyst in an enclosed reaction zone, and (d) contacting the fluidized catalyst with fluid reactant comprising hydrogen cyanide and acetylene in a temperature range of from about 650 to about 1000° F. so as to form acrylonitrile.

8. A process of claim 7 wherein said silica of step (a) is impregnated with an aqueous solution of sodium and potassium cyanides and a soluble calcium salt convertible to the oxide upon heating and wherein the particulate catalyst of step (b) is activated in a stream of $O_2$-containing gas at a temperature in the range of 900 to 1500° F.

References Cited

UNITED STATES PATENTS

| | | | |
|---|---|---|---|
| 2,854,473 | 9/1958 | Spaulding | 260—465.3 |
| 2,414,762 | 1/1947 | Owen | 260—464 |
| 2,593,099 | 4/1952 | Calingaert | 260—348.5 |
| 3,023,226 | 2/1962 | England et al. | 252—457 XR |

PATRICK P. GARVIN, Primary Examiner

U.S. Cl. X.R.

252—438